Jan. 2, 1951 E. E. LINDSEY 2,536,649
MEANS FOR THE MANUFACTURE OF ARTICLES OF FOOD
Filed May 21, 1946 6 Sheets-Sheet 1

INVENTOR.
Ernest E. Lindsey,
BY
Bradbury.
Attorney

Jan. 2, 1951 E. E. LINDSEY 2,536,649
MEANS FOR THE MANUFACTURE OF ARTICLES OF FOOD
Filed May 21, 1946 6 Sheets-Sheet 2

INVENTOR.
Ernest E. Lindsey,
BY
Attorney

Jan. 2, 1951 E. E. LINDSEY 2,536,649
MEANS FOR THE MANUFACTURE OF ARTICLES OF FOOD

Filed May 21, 1946 6 Sheets-Sheet 3

INVENTOR.
Ernest E. Lindsey,
BY
Attorney

Jan. 2, 1951          E. E. LINDSEY          2,536,649
MEANS FOR THE MANUFACTURE OF ARTICLES OF FOOD
Filed May 21, 1946          6 Sheets-Sheet 4

INVENTOR.
Ernest E. Lindsey,
BY
Attorney

Jan. 2, 1951 E. E. LINDSEY 2,536,649
MEANS FOR THE MANUFACTURE OF ARTICLES OF FOOD
Filed May 21, 1946 6 Sheets-Sheet 5

INVENTOR.
Ernest E. Lindsey,
BY
Attorney

Jan. 2, 1951 E. E. LINDSEY 2,536,649
MEANS FOR THE MANUFACTURE OF ARTICLES OF FOOD
Filed May 21, 1946 6 Sheets-Sheet 6

INVENTOR.
Ernest E. Lindsey,
BY
Attorney.

Patented Jan. 2, 1951

2,536,649

UNITED STATES PATENT OFFICE 2,536,649

MEANS FOR THE MANUFACTURE OF ARTICLES OF FOOD

Ernest E. Lindsey, Los Angeles, Calif.

Application May 21, 1946, Serial No. 671,193

13 Claims. (Cl. 107—14)

This invention relates to an improved method of preparing and cooking articles of food and the improved apparatus by which said method is carried into practice. More particularly this invention is advantageously adapted for cooking articles of food and improvements in apparatus of the type shown and described in U. S. Patents No. 1,381,421 (Reissue No. 16,143), and No. 1,569,383, which were issued to me.

With the present invention I take advantage of the fact that a dough or batter suitable for making food products generally known as sweet doughs, such as doughnuts, crullers, etc. can be prepared for a considerable length of time in advance of its being cooked when the ingredients are properly proportioned, suitably incorporated and the resultant dough or batter is thereafter held under proper conditions. I have made these doughs and held them for periods of much over a month and then cooked them; finding after doing so that there had been little, if any, deterioration in the quality of the final product. It is a well known fact that dough making is, at best, an untidy process and that due to inadequate facilities is ofttimes carried on under unfavorable and even unsanitary conditions; so this invention is also intended to eliminate such unfavorable conditions and to provide a semi-finished product ready for cooking; one that has been prepared under proper conditions and one which will provide a ready-mixed material of constant, dependable quality, flavor, consistency, etc., ready for instant use. Immediately after the mixing of this dough or batter the same is packed in suitable containers and there held until such time as the contents is extruded into the cooking medium of heated fat or other cooking media. I have found that a suitable container for this purpose is provided by the well-known pasteboard carton or what is commonly known as a "paper can" the same have been properly treated with paraffine or other water or damp-proof material. Such container is also easily disposible after it has been emptied of its contents. The preparation, packaging and delivery of the material as here outlined makes it practical and convenient to cover large areas of city or country, all supplied from a central mixing station where the manufacture of same may be carried on in bulk and costs thereby substantially reduced as well as always being able to establish a standardized control. An additional and particularly advantageous point is that where these doughs are finally used there is no mixing needed and all of the untidiness attendant is avoided, labor is saved and the proper sanitary requirements assured. To properly take advantage of these methods and to suitably finish, by cooking, the semi-finished products such as are herein outlined, I have produced certain mechanical apparatus and equipment to facilitate the use of the said products, a description of which will be set forth in the following specification.

In the particular device which is hereafter described I have chosen an article of food to be manufactured to which the term "doughnut" is applied. This term, however is intended to include any similar cooked product, such as cookies, etc., any of which can be made by changing a die.

Among the objects of the invention are the following: To prepare a suitable dough or batter that may be kept usable for an unusually long period of time. To package such batter in such manner that it can be distributed with facility over a considerable geographical area ready for instant use. To provide mechanical apparatus suitable for converting said dough or batter to a finished product ready for sale and in so doing to create great customer interest and the desire to purchase the products made by the machine; and by the excellence of the final product to insure repeated purchases and to do this in a practical, economical and labor-saving manner.

It is a further general object of my invention to improve the construction of the several parts of apparatus heretofore employed for cooking articles of food so as to increase the utility, widen the field of application and increase the facility of manipulation of such an apparatus.

My invention possesses numerous other objects and features of advantage, some of which, together with the foregoing, will be set forth in the following description of specific apparatus embodying and utilizing my novel method. It is therefore to be understood that my method is applicable to other apparatus and that I do not limit myself, in any manner, to the apparatus shown in the present application, as I may adopt various other embodiments, using my improved method within the scope of the appended claims.

In the accompanying drawings forming part of this specification.

The apparatus illustrated in the drawings for manufacturing my improved food product, such as doughnuts has a shell base A, resembling a skirt or suitable cross sectional shape, in the upper end of which a horizontal cooker pan or receptacle B is supported. A plurality of supporting columns 20 are secured to the pan at spaced intervals horizontally and extend upwardly. A horizontal supporting shelf 21 is secured to the upper ends of said columns to provide a supporting superstructure at a spaced distance above the body and pan for supporting a driving unit consisting of an electric motor C and the dough magazine and discharging apparatus to be hereinafter described.

The cooker pan is formed by the upstanding wall or web 22 with a horizontal spiral channel 23 starting at or near the center of the pan and terminating at or near its outer end. A body of cooking fat or other suitable fluid is maintained at suitable depth and cooking temperature in the cooking pan to fry pellets of dough or batter which are deposited into the cooking fluid near the central receiving head end of the spiral channel. The cooking fluid is maintained in liquid condition at cooking temperature by the electric heating element means 24 which is sectional in form and threaded through and held in the spiral channel 25 (Fig. 4) in the lower surface of the bottom wall of the pan and in substantially corresponding position below the spiral wall 22.

The cooking liquid is circulated forwardly from the central head end to the outer tail or delivery end of the spiral cooking channel by a propelling rotor 30. A return manifold 31 is provided on the under side of the floor of the cooker pan with its duct connecting the outer tail end with the central inner head end of the spiral channel. Said rotor is located below the ingress duct 38 of the manifold in its orifice and is driven by an upwardly extending shaft 32 which is journaled at its lower end on the tray B and at its upper end on the shelf 21. The upper end of said shaft has a rigidly connected drive pulley 34 which is driven at suitable speed by the belt 35. The latter is driven by a drive pulley 36 on the shaft of the propelling rotor C and travels over sheave pulleys 37.

Figure 12:
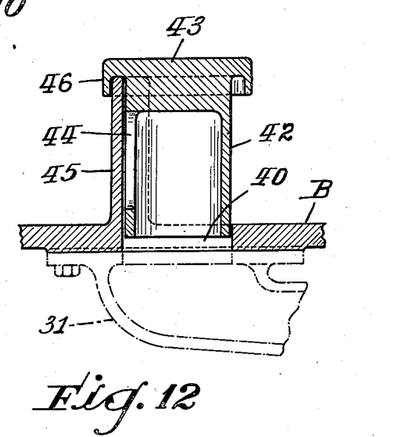
Fig. 12 is a vertical section taken on the line 12—12 of Fig. 11.

The outlet 40 (Fig. 12), at the inner end of the manifold 31 which delivers the cooking liquid into the head end of the spiral channel is provided with a manually controlled regulating valve 42. This valve has a swivel body 43 which projects above the level of the liquid in the cooker pan and has a port outlet 44 in its side which is regulated in size when its body is rotated about an arced gate 45, which latter engages the body 43 by a peripheral downwardly extending circular flange 46. The gate is an integral part of the spiral wall of the pan.

The vertical impeller shaft 32 which is driven by the motor C is connected near its lower end by the worm gearing 47 with a chain belt conveyor 48 which intercepts the current of cooking liquid in the cooking pan and delivers the finished doughnuts upwardly therefrom into a waiting receptacle (not shown). This conveyor is driven at suitable speed to deliver as fast as the doughnuts are cooked and transmitted by the current of cooking fluid which flows outwardly through the spiral channel.

Figure 6:
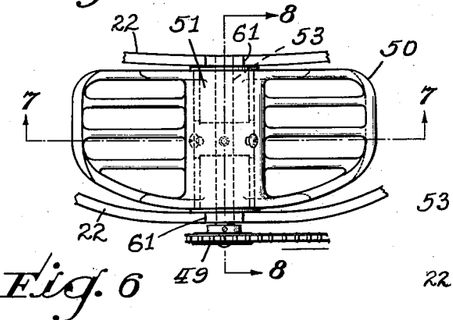
Fig. 6 is an enlarged plan view of a detail showing the turn over device which is employed in the spiral channel of the cooking pan.
Figure 7:
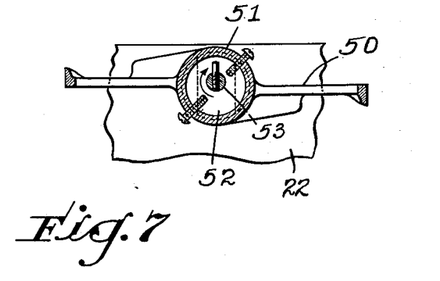
Fig. 7 is a section taken on the line 7—7 of Fig. 6.
Figure 8:
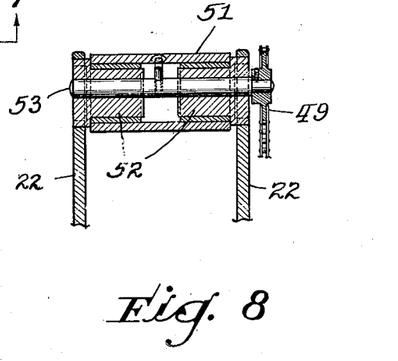
Fig. 8 is a section of the turn over device taken on the line 8—8 of Fig. 6.

Power is further transmitted by the operation of the conveyor 48 through a chain and sprocket connection 49 and shaft 53 to revolve the grate 50 of a turn over device. The grate is double in form and its median portion has a horizontal hub 51 (Figs. 6 to 8 inclusive) which contains eccentric bearings 52. These bearings are secured to shaft 53 which is journaled on the opposite pair of upstanding sections of the walls 22 of the spiral channel in substantially mid-position lengthwise of the latter to intercept the doughnut pellets as they are propelled forwardly by the cooking liquid. The function of the turn over device is to invert the doughnut pellets in the cooking fluid so that they will cook evenly on both sides.

Figure 5:
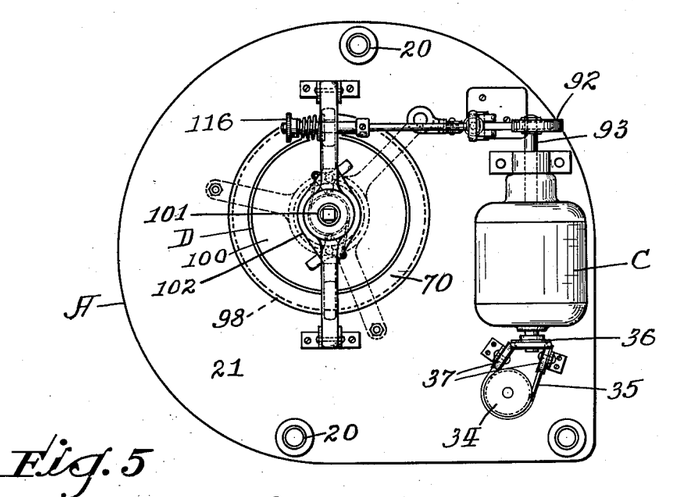
Fig. 5 is a plan of the structure shown in Fig. 1.

The turn over device, by its eccentric mounting is intermittent in its rotative movement. There is a half revolution and then a dwell, then another half revolution and another dwell, all being repeated successively. In operation a doughnut pellet is picked up, elevated and then dropped in a turn over state; then the turn over stops for a period long enough to permit said pellet to advance a sufficient distance to be clear of the next oncoming doughnut pellet. In this manner a piling up at this point is avoided. Fig. 5 shows how the turn over shaft is held in slots 61 so that the entire assembly can be lifted out of the walls of the spiral channel for purposes of cleaning.

Two easily removable dams or weirs 54 and 55 (Fig. 3) are interposed in the channel near each of the opposite ends of the turn over grate. A partly cooked doughnut pellet will slowly float and approach weir 55 and then suddenly speed ahead to contact the turn over device, being thereupon elevated and dropped back in the channel, in an inverted position, into the accelerated current caused by weir 54, where it quickly passes on and out of the path of the following pellet.

A drop plate 58 is placed at a chosen submerged distance in the cooking liquid near the ingress end of the spiral channel 53 upon which the circle of dough constituting the raw pellet can drop and rest momentarily as hereinafter described while the leaven in the dough starts to take effect and thus provide buoyancy to the dough. The drop-plate has an integral transverse weir 59 on the forward portion of its under side and is perforated at 60. The weir 59 including the drop-plate is removably supported by the opposite walls of the channel 23. The drop-plate creates an upward current of cooking liquid at that point which carries the dough pellets upwardly and outwardly into the spiral channel, thus preventing distortion in the dough from an annular shape and the possible superimposition of another piece of dough thereon. The dams or weirs 54, 55 and 59 perform an important function in changing the current velocities at these points. It will be seen that by use of these simple devices four different conditions are produced in velocities, directions and rates of flow of the cooking fluid, viz., normal flow, an upward current created at the drop-plate, an accelerated flow at weir 55 and another accelerated flow at weir 54; all in addition to the directional changes at the manifold 31.

Figures 3, 4:
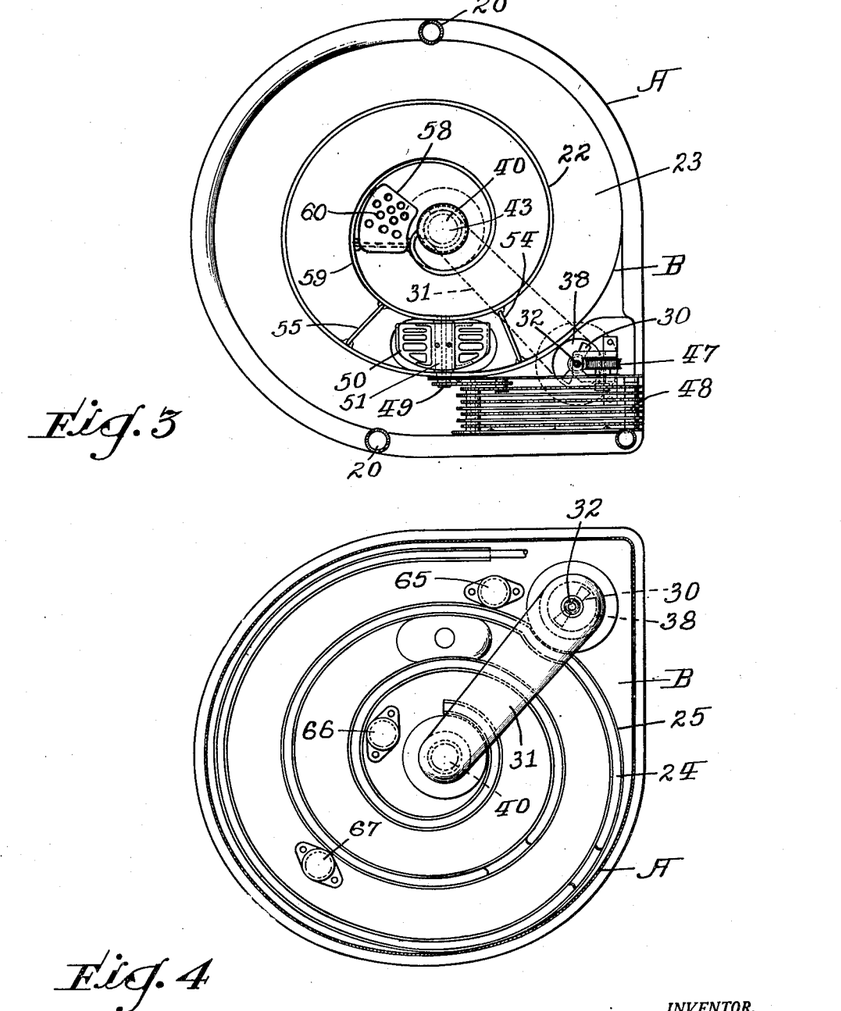
Fig. 3 is a horizontal section taken on the line 3—3 of Fig. 1.
Fig. 4 is a horizontal section taken on the line 4—4 of Fig. 1.

As shown in Fig. 4, the heating element means 24 may be divided into a plurality of sections which are controlled by individual thermostats 65, 66 and 67, whereby suitable separate controlling heating temperatures are delivered automatically to different portions of the cooking liquid in the spiral channel to suitably and most effectively cook the doughnuts.

Figure 16:
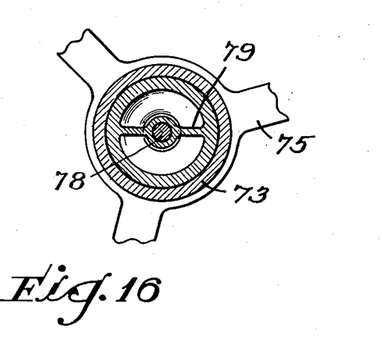
Fig. 16 is a section of a detail taken on the line 16—16 of Fig. 13.
Figure 17:
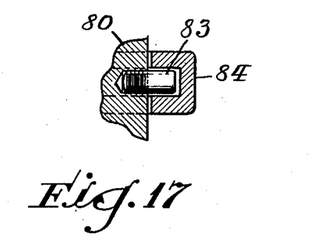
Fig. 17 is a section of a detail taken on the line 17—17 of Fig. 13.

The dough or batter after being prepared is packed in suitable magazine containers or cartridges. In the present instance the type of container D which is shown is of outwardly cylindrical shape and may be waterproofed. Suitable forming extruding mechanism is provided above the cooking pan B which successively forms the doughnut blanks or pellets from dough supplied by the containers. Each of these containers which holds the dough out of which the doughnuts are made is adapted to be removably held in the machine by a ring 70 (Fig. 5) through which the inverted lower end of the container is engaged. The inverted upper end of the container is supported upon a circular upflanged plate or seat 71 (Fig. 15) which resembles a shallow rimmed cup. This cup is held centrally by a downwardly tapering joint 72 upon a downwardly projecting nozzle or adapter 73 through which the raw dough from the container is extruded in the form of a series of relatively small annular pellets. The nozzle 73 is seated in the central circular collar 74 of a horizontal spider frame 75, the arms of which in turn are rigidly hung from the shelf 21 by the downwardly extending rods 76. The supporting means thus described is proportioned and arranged so the mouth of the nozzle is juxtaposed directly over the surface of the drop-plate 58 and the surface of the stream of cooking liquid which has been admitted into the head or innermost end portion of the spiral channel 23. A conical deflector 77 is held rigidly at a suitable distance below the orifice of the nozzle 73 by a core or stem 78, the latter being supported axially in the nozzle by the rib 79 (Fig. 16).

Figures 13, 14, 15:
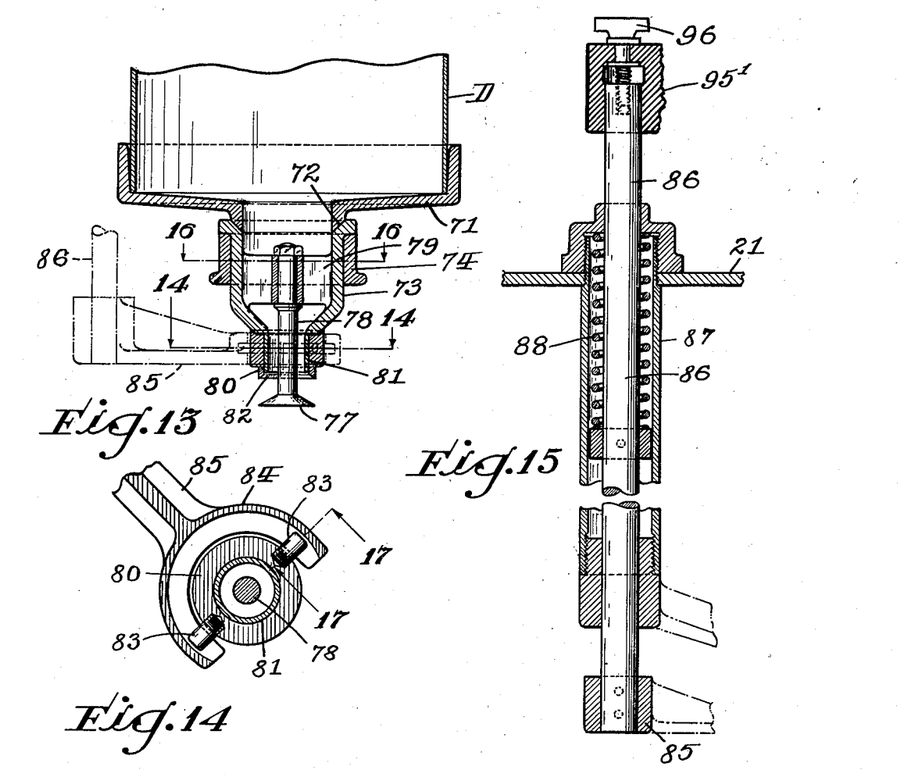
Fig. 13 is an enlarged sectional view of a detail taken on the line 13—13 of Fig. 1 showing the dough container or cartridge.
Fig. 14 is a horizontal section taken on the line 14—14 of Fig. 13.
Fig. 15 is an enlarged horizontal section of a detail take on the line 15—15 of Fig. 1.

A cutter valve 80 resembling a sleeve reciprocable vertically on the depending lower cylindrical portion of the nozzle 73 which is formed as an integral part of the nozzle 73. The lower end of the valve sleeve has an annular beveled cutting edge 82 which co-operates with the surface of the deflector and successively segregates the dough into annular pellets as the valve reciprocates and as the dough is extruded downwardly through the nozzle from the container. The valve sleeve is held by the trunnions 83 (Fig. 14) in the forked end 84 of an operating arm 85 which arm is reciprocated vertically by a thrust shaft 86. This shaft 86 is slidably supported in vertical position through one of the spider supporting rods 87 which is tubular and extends upwardly through the supporting shelf 21. The cutter valve is actuated into raised wide open position as shown in Fig. 13, by the helical expansion spring 88 which is threaded over the shaft 86 in the tubular support 87 (Fig. 15). Downward thrust reciprocable snap action movement is imparted to the reciprocable shaft to correspondingly actuate the cutter valve in relation to the conical deflector 77, by reciprocal power transmitting mechanism which is actuated by the power unit C. This power transmitting mechanism converts the rotary motion delivered by the motor into the reciprocating motion of the cutter valve, whereby the latter is operated in synchronism with the movement of the cooking fluid through the channel in pan B.

The power take off shaft 93 revolves at suitable slow speed. In practice this speed has been approximately 24 R. P. M., though said speed may be altered to suit conditions. The power transmitting mechanism resembles a rocker arm 90 or lever which is tiltingly mounted between its ends by the horizontal fulcrum 91 on shelf 21. The power end of the rocker arm is actuated against spring pressure (not shown) by the eccentric or cam 92 on the slow speed drive shaft section 93 (Fig. 5) of motor C. The work end of the rocker arm engages by a spring pressed pawl 94 (Fig. 20), a shoulder piece 95 on the side of lifter 95' and raises shaft 86. The pawl releases the thrust shaft automatically and the cutter valve thus functions by snap action under the influence of expansion spring 88. Downward thrust of shaft 86 is thus produced by spring 88 and upward movement is by the action of rocker arm raising the lifter 95'.

The stroke of the cutter valve actuating shaft 86 is regulated by thumb screw 96 in the lifter 95' (Fig. 15), whereby the amount of dough extruded through and segregated by the cutter valve during each cycle of operation is regulated. The shape of the doughnuts and their size is also controlled by the co-operating deflector 77, stem 78, cylindrical portion 81 and cutter valve 80. The shape of the doughnut pellet which is produced by the machine is substantially circular with a small central opening therethrough.

In use the cover on the upper end of the magazine container D which holds the dough to be used is removed and the cup 71 substituted. The container is then inverted and thrust downwardly through a suitable circular opening 98 (Fig. 5) in the shelf 21 and its cup member 71 secured to the nozzle 73 by the tapering joint 72. The protecting collar 70 is then placed closely around the upper end of the container and secured in said opening 98. Next the pressure piston or pressure ring 100 on the lower end of a vertically disposed screw threaded reciprocable feed shaft 101 is applied to the now upward end 100' of the container, said piston substantially corresponding with the inner diameter of the inturned magazine end 101' of the container. Application of pressure downwardly upon the end wall 100' separates the bottom end from the body of the container and said end becomes a packing ring to produce a tight working fit between the piston and side of the container. A disc pad 100'' composed of suitable expansive material such as sponge rubber is interposed between the piston and end member 100' to assist in producing an effective sliding joint between the piston and side of the container. The piston is thus employed to apply pressure which is developed by the electric motor C to the dough in the container so as to extrude the dough through the nozzle and cutter valve. The walls of the container may be composed of water proofed compressed fiber resembling heavy paper or other suitable material and are of a strength and rigidity to withstand the pressure applied to the dough by the piston without swelling or buckling.

Figure 9:
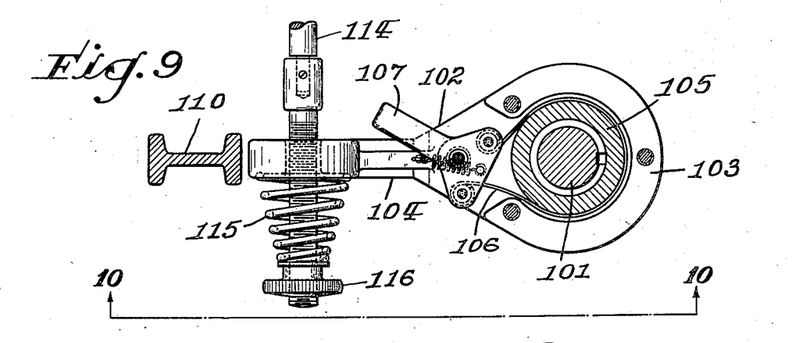
Fig. 9 is an enlarged section taken approximately on the line 9—9 of Fig. 2, showing the clutch mechanism.
Figure 10:
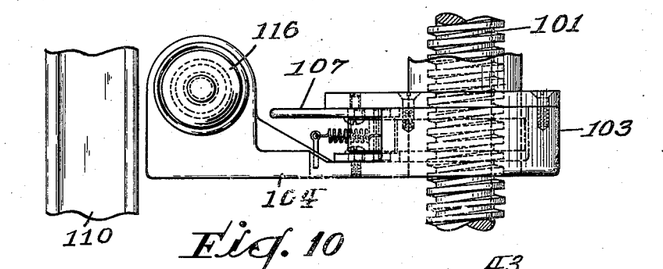
Fig. 10 is a side view of the clutch mechanism taken in the plane indicated by the line 10—10 of Fig. 9.
Figure 11:
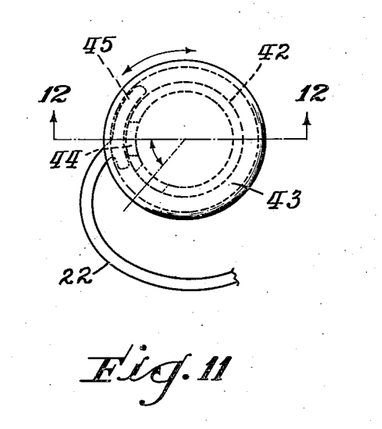
Fig. 11 is an enlarged plan view of the current regulating valve which is located at substantially the center of the cooking pan.

The pressure piston is forced slowly downwardly step by step without revolving to extrude the dough from the container under substantially continuous even pressure by clutch mechanism 102. This clutch mechanism is double in form, each member having a body 103 (Fig. 9) which is freely rotatable about the upper portion of the pressure screw 101, and an integral operating arm 104 which transmits reciprocating movement to the clutch body. A circular sleeve 105 freely threaded and rotated by the clutch body on the shaft is journaled in the body 103. The sleeve 105 is rotated in clockwise direction when engaged by the friction band 106 and causes the shaft to move step by step longitudinally in one direction to exert pressure upon the dough in the container. The friction band is released or applied by the off center spring controlled hand operable lever 107. One member of the clutch mechanism is adapted to operate the threaded sleeve 105 in clockwise direction to apply pressure downwardly by the pressure piston while the opposite member is arranged to revolve its threaded sleeve in anticlockwise direction to return the piston upwardly. During the latter operation the friction band on the opposite clutch member is released by lever 107. The actuating sleeve 105 is held by its upper end between the fixed bearing elements 108 and 109 on an upper yoke frame 110, which latter is hinged by one end at 111 upon shelf 21 and is detachably coupled in normal upstanding fixed position at its opposite end to said shelf by the removably pin 112. This mode of fastening permits the yoke and the pressure piston element 100 to be tilted back out of the path of receptacle D when the latter is either removed from or inserted into the machine.

The lever 90 has a crank arm 113 which transmits reciprocable motion by the connection 114 to the outer end of the clutch operating arm 104, through a resilient adjustable connection produced by the helical spring 115 and the knurled adjusting nut 116. Thus by tightening or loosening the nut 116 the desired pressure upon the dough in the container is produced to assist in regulating the size of the dough pellet. This pressure may cover a range of from nil at the piston to one of as many pounds per square inch as may be desired. The secondary adjustment of the lifter 25 is made by the thumb screw 96 (Fig. 15) to vary the amount of opening of the dough cutting valve. These two adjustments provide complete adjusting means for controlling the amount of dough deposited into the cooking medium and the consequent size of the doughnuts produced at each operation of the cutter valve.

Figures 1, 19, 20:
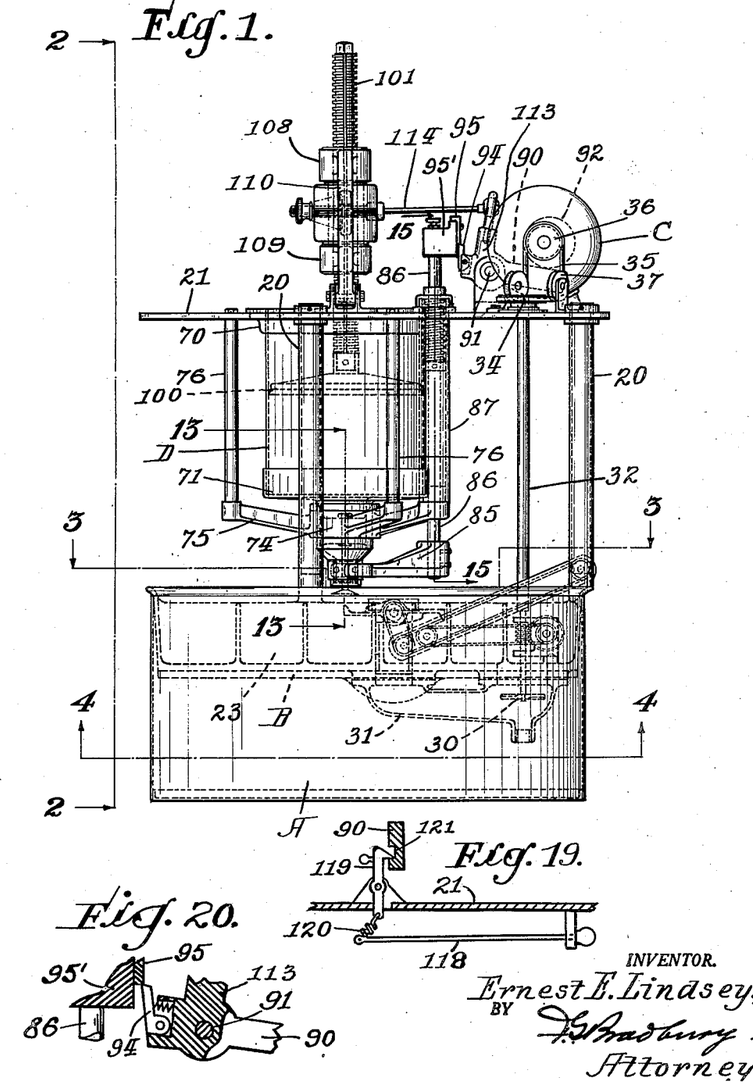
Fig. 1 is a front elevation of my improved machine or apparatus for manufacturing articles of food such as miniature doughnuts.
Figs. 19 and 20 are diagrammatic views of details showing the manner in which rocker arm 90 functions.
Figures 2, 18:
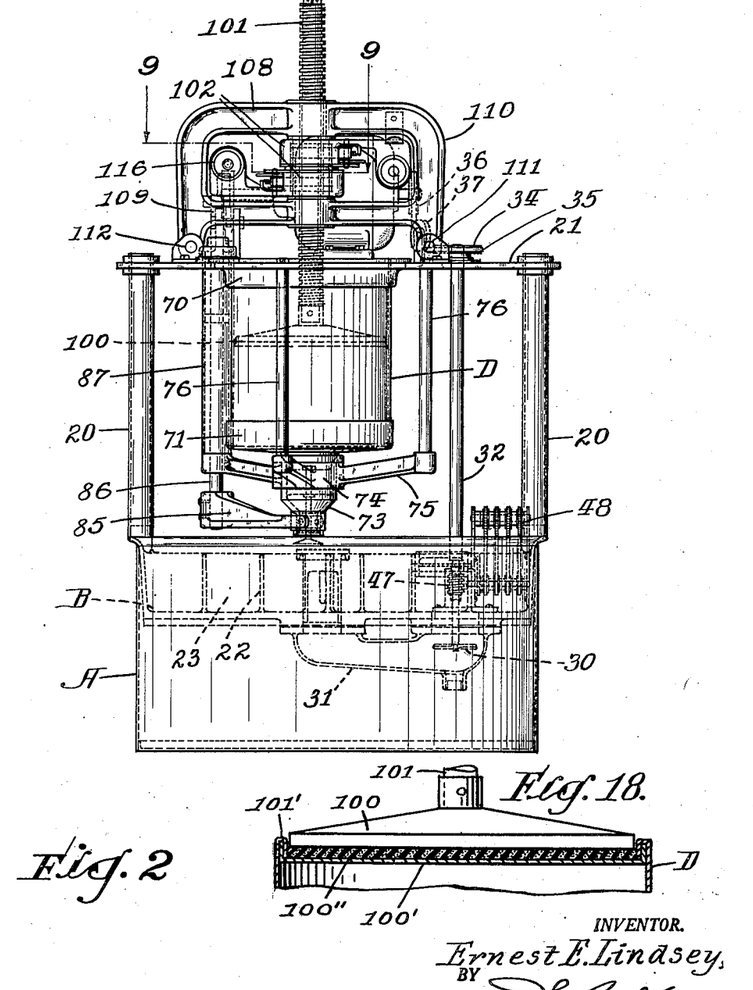
Fig. 2 is a side elevation of the structure shown in Fig. 1, the view being taken in the vertical plane indicated by the line 2—2 of Fig. 1.
Fig. 18 is an enlarged sectional view of a detail illustrating the manner in which the piston or pressure ring is applied to the inverted bottom end of the container.

The dough extruding apparatus can be controlled by hand to stop the piston and cutter valve through the operation of a pull rod 118 which is illustrated schematically in Fig. 19. This rod is reciprocally held on the lower side of the shelf 21 and is connected to the operating arm of a pawl 119 by a helical spring 120. The pawl is arranged to engage a shoulder 121 automatically, in the power arm of lever 90 when the arm 114 is pushed inwardly and is held out of engaging position when the rod is pulled outwardly.

*Operation*

The cooking fluid is first heated to the desired cooking temperature. The container or cartridge containing the dough or batter out of which the doughnuts are made is prepared for use by removing the cover on its upper end and substituting the cup 71 which has the nozzle 73. The yoke 110 is next disconnected at one end and tilted into open position. The container is then inverted and inserted by its upper end downwardly through the opening 98 in the shelf 21 and the nozzle on the cup is tightly connected with the upper end of the valve body by the tapering joint 72. The collar 70 is placed in the circular opening 98 in the shelf around the bottom of the inverted container and the yoke 110 is closed and latched fast. The pressure shaft and its pressure piston 100 are thus swung down into juxtaposition with the upstanding bottom of the container. The motor C is started and the latch at the work end of the rocker arm 90 is released. The machine will now be in automatic operation and the bottom of the dough container will be pressed inwardly out of engagement with the body of the container by the pressure piston as the clutch is actuated and become a packing ring around the peripheral edge of the piston to produce a leakproof connection with the inner cylindrical wall of the container. A ring of dough will be extruded from the cutter valve 80 and expelled downwardly into the cooking fluid where it will rest for a moment on the drop-plate 58 as the piston is propelled downwardly and exerts pressure on the dough in the container. Simultaneously the cooking fluid is propelled forwardly and buoyancy within the dough at the point of the drop-plate will cause the ring of dough to float off in the channel 23. Thereafter, in its slow travel within the channel the ring of dough becomes partly cooked; reaching weir 55 it suddenly speeds up and makes contact with the turn over grate 50 which picks it up automatically and turns it over, depositing it at the point of the weir 54 where, on account of the again accelerated current, it speeds away into the again slow moving current. Continuing on around the channel it completes its cooking period and the completed doughnut reaches the conveyor 48 which picks it up and carries it out of the cooking fluid to deposit it over the edge of the cooking pan B into a receiving receptacle (not shown), cooked and ready to be eaten.

This operation is repeated over and over again at whatever speed the machine is set to operate, a preferred speed being about twenty-four times a minute. The cooking time from the time the dough is deposited by the cutter valve into the cooking fluid to the time it is delivered finished by the conveyor will average a little in excess of one minute. When all of the dough in the container has been used the clutch mechanism 102 is set, the pressure shaft and disc returned to top or starting position, the yoke opened and the empty container shell removed. Thereupon another filled container is inserted and the cycle of operations repeated as many times as may be desired.

In accordance with the patent statutes, I have described the principles of operation of my invention together with the construction thereof which I now consider to represent the best embodiment thereof, but I desire to have it understood that the method and means described are only illustrative and that the invention can be carried out by other means and applied to uses other than those above set forth within the spirit of the invention and the scope of the following claims.

The claims of this application relate only to the superstructure disclosed therein. Applications Serial Nos. 164,456 and 164,457 which are continuations-in-part of the present application, make an identical disclosure, which comprises an improved cooker and an improved superstructure. Serial No. 164,457 claims the cooker shown in the present application, claims the improvements made on this cooker, claims combinations of elements of the cooker disclosed herein with elements of the superstructure shown herein, and also with elements of the improved superstructure and combinations of the elements of the improved cooker with elements of the improved superstructure. Serial No. 164,456 presents claims relating to the improved superstructure and to combinations of elements of the improved superstructure both with elements of the cooker disclosed in the present application and elements of the improved cooked disclosed in Serial No. 164,457.

I claim:

1. In a continuously operating, power driven cooking machine for the production successively of a plurality of similarly shaped and sized annular products; the combination of: a holder for a portable dough container; a nozzle positioned below the holder to receive dough from the container; an annular die at the lower outlet of the nozzle comprising a conical deflector positioned below said nozzle in vertically spaced relation from the lower edge of said nozzle to provide an annular space for the extrusion of the dough; means for extruding the dough from said container through said nozzle and said annular space; a sleeve slidably mounted concentrically around the lower end portion of said nozzle, said sleeve having at its lower end a cutting edge normally adjacent the conical deflector; power means for withdrawing the sleeve upwardly from the deflector to a position where its cutting edge is adjacent the lower end of the nozzle, said withdrawal movement being against the action of a spring; and a trip release of the sleeve for disconnecting it from the power withdrawal means for suddenly returning the sleeve to its normal position under the action of the spring.

2. The combination defined in claim 1 and in addition thereto means for varying the juncture of the release relative to the time cycle of movement of the sleeve to vary the length of the upward movement of the sleeve and consequently the length of the sudden downward cutting stroke, and both the depth of annular space through which the dough is extruded and the time interval during which said space is open for the passage of dough.

3. In a continuously operating, power driven cooking machine for the production successively of a plurality of similarly shaped and sized cooked products, the combination of: means on the machine for holding an elongated removable dough container in vertical position; means for receiving the dough from said container and forming it into dough portions of similar size and shape in readiness for the cooking operation; a vertically disposed reciprocally movable screw threaded feed shaft mounted centrally above the position of said dough container; a pressure disk mounted on the lower end of said shaft for expressing the dough downward through said container to the said dough forming means; a sleeve internally formed to engage the threads of said shaft, said sleeve being mounted on the machine to surround said shaft; a horizontally disposed lever arm for turning said sleeve; a manually releasable unidirectional clutch mechanism for transmitting from said lever a step-by-step arcuate movement to said sleeve in a direction of rotation to move the pressure plate downward; a motor; and a reciprocating rod operated by said motor to give said lever arm a reciprocating oscillatory movement.

4. The combination defined in claim 3 and in addition thereto a spring operatively interposed between said reciprocating rod and the lever arm for resiliently applying the longitudinally acting forces in the rod for effecting rotative movement of the sleeve to move the shaft and pressure plate downward against the resistance of the dough.

5. The combination defined in claim 3 in which the shaft, sleeve, clutch mechanism, lever, and reciprocating rod are mounted on a frame horizontally pivoted to the machine above the position of the dough container for swinging movement out of vertical alinement with said position for removal of the dough container.

6. The combination defined in claim 3 in which the unidirectional clutch is reversible; and in addition thereto a manual lever for operating the sleeve when the clutch is set to operate in the reverse direction.

7. In a continuously operating, power driven cooking machine for the production successively of a plurality of similarly shaped and sized cooked products and of the type in which dough is received in bulk by the machine from a portable container having cylindrical side walls, a removable disk shaped cover at one end and a disk shaped wall secured to said cylindrical side walls at the other end, and in which the dough is then converted into a plurality of successively and similarly formed portions, and in which the portions are successively deposited in a continuously circulating stream of cooking fluid, means for thus receiving and converting the dough, comprising in combination: a frame structure; means for holding the container in the frame structure, said means comprising a horizontally disposed ring laterally immovably secured in the frame structure and formed with a central aperture and with an annular seat of the diameter of the cylindrical walls of the container for receiving in abutting fashion from above the circular end edge of one end of the container, said ring having associated means for preventing lateral movement of the said end of the container, said holding means also comprising means disposed at the upper end of the space available for the container which is laterally immovably secured on the frame structure in position to prevent lateral displacement of the other end portion of the cylindrical side wall of the container, the said holding means permitting vertical movement of the container downwardly to and upwardly from said seat; a pressure disk of substantially the inside diameter of the container and snugly fitting between the container walls for horizontal disposition concentrically of the space available for the container and adjacent the position of the upper end thereof; a power source; means disposed vertically adjacently above the container and actuated by said power source for moving the pressure disk axially through the container; means associated with said ring and below its central aperture and actuated by said power source for intermittently forming and severing the dough expressed through said central aperture into dough portions of similar size and shape for deposit in the stream of cooking fluid, the container holding means and the said pressure disk moving means thereabove being permanently secured to the frame structure in a manner to permit their relative adjustment to provide a free space for removing the container vertically upwardly from the holding means.

8. In a continuously operating, power-driven cooking machine for the production successively of a plurality of similarly shaped and sized cooked products and of the type in which dough is received in bulk by the machine from a portable cylindrical container having a removable circular cover at one end and a severable flat circular disk secured to the other end and in which the dough is then converted into a plurality of successively and similarly formed portions, and in which the portions are successively deposited in a continuously circulating stream of cooking fluid, means for thus receiving and converting the dough, comprising in combination: a frame structure; a horizontally disposed ring laterally immovably securable in the frame structure for receiving from above in abutting fashion the circular lower rim of the downwardly directed open end of the uncovered container, said ring having axially extending means for engaging the end portion of the cylindrical side wall of the container for preventing lateral displacement thereof, and said ring also having a central aperture for the passage of dough therethrough; a lateral retention ring of rigid material, laterally immovably securable on the frame in position above said first-mentioned ring to snugly embrace the opposite end portion of the cylindrical side wall of the container; a pressure member having a flat face and a periphery of substantially the inside diameter of the container to snugly fit the side wall surfaces of the container, said pressure member being normally disposed above the severable disk at the upper end of the container; means for moving the pressure member to contact and then sever the said severable disk and move said disk through the container; and means associated with said first-mentioned ring and disposed directly below said central aperture for intermittently forming and severing the dough passing through said central aperture into dough portions of similar size and shape for deposit in the stream of cooking fluid.

9. In a continuously operating, power-driven cooking machine for the production successively of a plurality of similarly shaped and sized cooked products, the combination of: means on the machine for holding an elongated removable dough container in vertical position; means for receiving the dough from said container and forming it into dough portions of similar size and shape in readiness for the cooking operation; a vertically disposed reciprocally movable screw threaded feed shaft mounted centrally above the position of said dough container; a pressure disk mounted on the lower end of said shaft for expressing the dough downward through said container to the said dough forming means; a sleeve internally formed to engage the threads of said shaft, said sleeve being mounted on the machine to surround said shaft; a horizontally disposed lever arm for turning said sleeve; means for rotating said sleeve intermittently at regular intervals in a step-by-step arcuate movement in a direction to move the pressure plate downward; and a motor connected to drive said rotating means, said shaft, sleeve and rotating means being mounted on a frame horizontally pivoted to the machine above the position of the dough container for a swinging movement out of vertical alignment with the dough container for moving it vertically upward out of the holding means.

10. In a continuously operating power driven cooking machine for the production successively of a plurality of similarly shaped and sized cooked products of a type in which dough is received in bulk by the machine from a portable container having straight sided parallel side walls and at least one transverse wall closing an end opening of the side walls, the side walls being made of a non-metallic, inelastic material of such a character that accidentally formed inward dents will yield outwardly upon the movement between the side walls of a piston-like pressure plate, the combination of: a cooker having means providing a horizontal stream of hot cooking fluid; a frame structure above the cooker; means on the framework for successively forming and severing dough portions of similar size and shape and dropping them into the upstream end of the cooking stream, including a vertically disposed removable nozzle, through which the dough passes; means removably mounted on the frame structure immediately above said nozzle for receiving from above, end downward, one of said containers and supporting it at a fixed level and in laterally fixed position, said means being centrally apertured in tight registry with said nozzle; a piston-like pressure plate for applying downward extruding pressure to the dough in the supported container; means for applying pressure to said plate, including a pressure reactance means on the frame work, said reactance means being adjustably mounted on the framework for lateral movement with respect thereto to afford space for free vertical movement of the container for insertion or removal thereof; and means normally laterally immovably positioned with respect to said framework, when the container and the pressure reactance means are in position for extrusion, for centering the upper end of the container with respect to the pressure applying means.

11. The combination defined in claim 10 in which the means for centering the upper end of the container is separate from the lower container supporting means, leaving a substantial length of exposed container side walls therebetween.

12. The combination defined in claim 8, in which said first mentioned ring is separable from the frame structure to permit its being seated upon the uncovered container prior to inverting and positioning said container in the machine.

13. The combination defined in claim 8 and in addition thereto a circular pad of material having the compressive characteristics of sponge rubber of substantially the same diameter as the pressure member, and disposed on the pressure face of the pressure member.

ERNEST E. LINDSEY.

(References on following page)

REFERENCES CITED

The following references are of record in the file of this patent:

UNITED STATES PATENTS

| Number | Name | Date |
|---|---|---|
| 1,384,310 | Dungan | July 12, 1921 |
| 1,516,962 | Gunsolley | Nov. 25, 1924 |
| 1,559,729 | Morris | Nov. 3, 1925 |
| 1,569,383 | Lindsey | Jan. 12, 1926 |
| 1,704,784 | Brubaker | Mar. 12, 1929 |
| 1,751,128 | Cocks | Mar. 18, 1930 |
| 1,768,172 | Triplett | June 24, 1930 |
| 1,821,689 | Broeg | Sept. 1, 1931 |
| 1,933,557 | Kalvin | Nov. 7, 1933 |
| 1,956,073 | Krause | Apr. 24, 1934 |
| 2,067,849 | Hunter | Jan. 12, 1937 |
| 2,070,206 | Hudson | Feb. 9, 1937 |
| 2,111,582 | Crew | Mar. 22, 1938 |
| 2,175,543 | Valle | Oct. 10, 1939 |
| 2,191,284 | Morris | Feb. 20, 1940 |
| 2,313,949 | Lagaard | Mar. 16, 1943 |